Patented May 27, 1947

2,421,352

UNITED STATES PATENT OFFICE 2,421,352

SUBSTITUTED THIOCARBAMO SULFENAMIDES

Philip T. Paul and Byron A. Hunter, Naugatuck, Conn., assignors to United States Rubber Company, New York, N. Y., a corporation of New Jersey No Drawing. Original application March 9, 1944, Serial No. 525,774. Divided and this application April 26, 1944, Serial No. 532,881

5 Claims. (Cl. 260—551)

This invention relates to new chemical compounds which are useful as vulcanization accelerators in the vulcanization of rubbers, both natural and synthetic, such as Hevea brasiliensis and various polymers such as butadiene-styrene copolymer, butadiene - acrylonitrile copolymer, isoprene-isobutylene copolymer, etc.

This application is a division of our copending application Serial No. 525,774, filed March 9, 1944.

The new class of rubber vulcanization accelerators are N',N'-disubstituted thiocarbamo sulfenamides in which the sulfenamide nitrogen is directly attached to each of two carbon atoms, as represented by the grouping

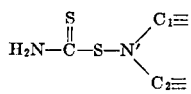

where the carbon atoms $C_1$ and $C_2$ each belong to a similar or dissimilar group selected from the aliphatic, alicyclic, or heterocyclic series.

There is considerable confusion in the technical literature concerning the nomenclature of compounds containing the —S—N linkage. The nomenclature which is proposed and followed in this specification considers these compounds as amides of the hypothetical thiocarbamo sulfenic acid

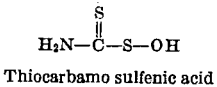

Thiocarbamo sulfenic acid

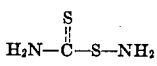

Thiocarbamo sulfenamide

In the formula for thiocarbamo sulfenamide there are two nitrogen atoms one belonging to the thiocarbamo nucleus and the other belonging to the sulfenamide nucleus. These are differentiated by referring to the thiocarbamo nitrogen as the "N" nitrogen and the sulfenamide nitrogen as the "N'" nitrogen. According to this system the compound

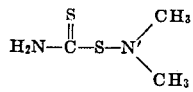

is named N',N'-dimethyl thiocarbamo sulfenamide. $C_1$ and $C_2$ may be carbon atoms of aliphatic groups (saturated or unsaturated) such as methyl, ethyl, propyl, methallyl, amyl, hexyl, allyl, butyl, benzyl, lauryl, etc., exemplified by N',N'-dimethyl thiocarbamo sulfenamide, N',N'-diethyl thiocarbamo sulfenamide, N',N'-dipropyl thiocarbamo sulfenamide, N',N'-dimethallyl thiocarbamo sulfenamide, N',N'-diamyl thiocarbamo sulfenamide, N',N'-dihexyl thiocarbamo sulfenamide, N',N'-diallyl thiocarbamo sulfenamide, N',N' - dibutyl thiocarbamo sulfenamide, N'-methyl N'-benzyl thiocarbamo sulfenamide, N'-ethyl N'-benzyl thiocarbamo sulfenamide, N',N'-dibenzyl thiocarbamo sulfenamide, N',N'-dilauryl thiocarbamo sulfenamide, N'-methyl N'-butyl thiocarbamo sulfenamide, or carbon atoms of alicyclic groups such as cyclohexyl, etc., exemplified by N',N'-dicyclohexyl thiocarbamo sulfenamide, N'-methyl N'-cyclohexyl thiocarbamo sulfenamide, N'-ethyl N'-cyclohexyl thiocarbamo sulfenamide, or carbon atoms of a heterocyclic ring having the nitrogen atom as a hetero ring atom, as exemplified by N',N'-dimethylene thiocarbamo sulfenamide, N',N'-tetramethylene thiocarbamo sulfenamide, N',N'-trimethylene thiocarbamo sulfenamide, N',N' - pentamethylene thiocarbamo sulfenamide, N',N' - oxydiethylene thiocarbamo sulfenamide, N',N'-thiodiethylene thiocarbamo sulfenamide; or the said carbon atoms may be part of substituted groups such as in N',N'-di-b-hydroxy ethyl thiocarbamo sulfenamide, N',N'-di-b-chloroethyl thiocarbamo sulfenamide, N',N'-di-b-(dimethyl amino) ethyl thiocarbamo sulfenamide.

The chemicals of this invention are prepared by reacting a salt of a dithiocarbamic acid with an N-halogenated secondary aliphatic amine which in turn may be prepared from a hypochlorite and a secondary amine, e. g., (A)   $R_2NH + NaOCl \longrightarrow R_2NCl + NaOH$

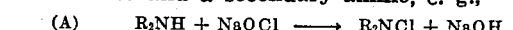
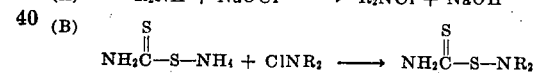

($R_2$ represents dimethyl, dicyclohexyl, pentamethylene, oxydiethylene, etc.).

During the preparation of the chloramines it is advisable to maintain the pH from 7 to 10 by the addition of acidic or basic reagents as required. In the cases of diamyl and dibutyl amines the optimum pH has been found to be about 8. In this connection, buffering agents are quite useful in controlling the pH. The ammonium dithiocarbamate may be prepared from carbon disulfide and ammonia in water solution or in non-aqueous solvents.

The reaction between ammonium dithiocarbamate and the N-chloramine is preferably carried out at room temperature or lower. In the preparation of the N-chloro amines, adequate precautions for ventilation and cooling should be observed.

The following examples, in which the parts are by weight, are given to further illustrate the invention.

*Example 1.—Preparation of N',N'-dibutyl thiocarbamo sulfenamide*

To a mixture of 97 grams technical dibutyl amine and 550 cc. water, dilute hydrochloric acid is added until the pH is approximately 8. With cooling in an ice bath and stirring, a solution of 56 grams sodium hypochlorite in 670 cc. water is gradually added. It is recommended that the hypochlorite solution be freshly prepared. After stirring one hour to complete the formation of the N-chlor dibutyl amine, a solution of 74 grams ammonium dithiocarbamate in 100 cc. water is added and the stirring continued for 12 hours during which time the reaction mixture is allowed to warm to room temperature. The product is a brown oil, lighter than water, which is separated, washed with dilute acetic acid and dried over a suitable drying agent such as potassium carbonate.

[Yield 40 grams]

| Analysis | Theory | Found |
|---|---|---|
| Per Cent Sulfur | 29.1 | 30.17 |

*Example 2.—Preparation of N',N'-dibutyl thiocarbamo sulfenamide*

This material is prepared as described in Example 1, except that, in place of the dibutyl amine, 118 grams technical diamylamine are used. 30 grams of N',N'-diamyl thiocarbamo sulfenamide is obtained as a brown oil.

| Analysis | Theory | Found |
|---|---|---|
| Per Cent Sulfur | 26.8 | 22.5 |

*Example 3*

The above chemicals were each tested in a tread stock compounded from synthetic rubber.

| Master Batch | Parts |
|---|---|
| Butadiene-styrene copolymer | 100.0 |
| Refined coal tar | 5.0 |
| Carbon black | 50.0 |
| Stearic acid | 2.0 |
| Zinc oxide | 5.0 |
| Sulfur | 2.0 |
| | 164.0 |

| | A | B |
|---|---|---|
| Master Batch | 164 | 164 |
| N',N'-dibutyl thiocarbamo sulfenamide | 0.5 | |
| N',N'-diamyl thiocarbamo sulfenamide | | 0.5 |

The stocks A and B were prepared and vulcanized in a press at 45 pounds per square inch steam pressure, for 30, 45, and 60 minutes. Suitable test pieces were cut and tested. In the following table tensiles are in pounds per square inch and elongations in percent.

| Cure in Minutes | A | | B | |
|---|---|---|---|---|
| | Tensile | Elong. | Tensile | Elong. |
| 30 | 720 | 867 | 440 | 850 |
| 45 | 1,480 | 800 | 1,180 | 810 |
| 60 | 2,110 | 700 | 2,020 | 717 |

The present accelerators are also useful in conjunction with other accelerating agents such as the mercapto thiazoles, mercapto aryl thiazoles, mercapto thiazolines, diaryl guanidines and their salts, dithiocarbamates, etc.

These chemicals are also useful as high pressure lubricant aids, gasoline antioxidants, and as bactericides, fungicides, and insecticides.

The term "a rubber" in the appended claims is employed in a generic sense to designate rubbery materials capable of vulcanization when heated with sulfur, and includes besides natural rubbers, rubber isomers, and artificially-prepared rubbers such as first herein referred to, and latices of any such materials, whether or not admixed with pigments, fillers, softeners, antioxidants, other accelerators, etc.

The present invention is not limited to the specific examples above set forth wherein preferred accelerators are employed. Other ratios of the compounding ingredients than those mentioned in the example as well as other well-known fillers, pigments, and the like may be employed in the production of various types of rubber compounds as will be apparent to those skilled in the art to which this invention pertains.

Having thus described our invention, what we claim and desire to protect by Letters Patent is:

1. An N'-disubstituted thiocarbamyl sulfenamide of the formula $$H_2N-\overset{\overset{\displaystyle S}{\|}}{C}-S-N\diagdown_{R_2}^{R_1}$$

where $R_1$ and $R_2$ each represent hydrocarbon radicals selected from the class consisting of aliphatic, aralkyl, and cycloalkyl radicals.

2. An N',N'-dibutyl thiocarbamyl sulfenamide.
3. An N',N'-diamyl thiocarbamyl sulfenamide.
4. An N',N'-di-aliphatic hydrocarbon thiocarbamyl sulfenamide.
5. An N',N'-dialkyl thiocarbamyl sulfenamide.

PHILIP T. PAUL.
BYRON A. HUNTER.

REFERENCES CITED

The following references are of record in the file of this patent:

UNITED STATES PATENTS

| Number | Name | Date |
|---|---|---|
| 2,318,482 | Hanslick | May 4, 1943 |
| 2,160,851 | Faust | June 6, 1939 |
| 2,285,813 | Hanslick | June 9, 1942 |
| 2,333,468 | Cooper | Nov. 2, 1943 |
| 2,381,392 | Smith | Aug. 7, 1945 |

FOREIGN PATENTS

| Number | Country | Date |
|---|---|---|
| 323,421 | Great Britain | Apr. 23, 1925 |
| 712,418 | France | Oct. 2, 1931 |
| 8,103 | Australia | 1932 |